United States Patent
Singh et al.

(10) Patent No.: US 10,127,107 B2
(45) Date of Patent: Nov. 13, 2018

(54) METHOD FOR PERFORMING DATA TRANSACTION THAT SELECTIVELY ENABLES MEMORY BANK CUTS AND MEMORY DEVICE THEREFOR

(71) Applicant: FREESCALE SEMICONDUCTOR, INC., Austin, TX (US)

(72) Inventors: Vivek Singh, Noida (IN); Aman Dahiya, Haryana (IN); Navdeep Singh Gill, Mumbai (IN); Piyush K. Upadhyay, Noida (IN)

(73) Assignee: NXP USA, INC., Austin, TX (US)

( * ) Notice: Subject to any disclaimer, the term of this patent is extended or adjusted under 35 U.S.C. 154(b) by 215 days.

(21) Appl. No.: 15/236,459

(22) Filed: Aug. 14, 2016

(65) Prior Publication Data
US 2018/0046392 A1   Feb. 15, 2018

(51) Int. Cl.
G06F 11/10   (2006.01)
(52) U.S. Cl.
CPC ...... *G06F 11/1076* (2013.01); *G06F 11/1048* (2013.01)
(58) Field of Classification Search
CPC ...... G06F 3/0619; G06F 3/0625; G06F 3/064; G06F 3/0659; G06F 3/0673; G06F 11/1076
USPC ........................................................ 711/154
See application file for complete search history.

(56) References Cited

U.S. PATENT DOCUMENTS

| | | | |
|---|---|---|---|
| 6,499,085 B2 * | 12/2002 | Bogin ............... | G06F 12/0835 711/118 |
| 6,795,896 B1 | 9/2004 | Hart et al. | |
| 7,127,560 B2 * | 10/2006 | Cohen ................. | G06F 1/3225 711/141 |
| 7,254,075 B2 * | 8/2007 | Woo ..................... | G11C 7/065 365/206 |
| 7,660,183 B2 * | 2/2010 | Ware .................... | G11C 5/14 365/230.03 |
| 7,793,037 B2 * | 9/2010 | Jain ..................... | G11C 7/1021 711/104 |

(Continued)

OTHER PUBLICATIONS

T. Zhang, K. Chen, C. Xu, G. Sun, T. Wang, and Y. Xie. 2014. Half-DRAM: a high-bandwidth and low-power DRAM architecture from the rethinking of fine-grained activation. In Proceeding of the 41st annual international symposium on Computer architecuture (ISCA '14). IEEE Press (Year: 2014).*

(Continued)

*Primary Examiner* — Reginald G Bragdon
*Assistant Examiner* — Aaron D Ho
(74) *Attorney, Agent, or Firm* — Charles E. Bergere

(57) ABSTRACT

A system for performing a data transaction between a memory and a master via a bus based on a strobe signal. The memory includes at least one memory bank having first and second cuts. The data transaction is either a read transaction or a write transaction. The system includes an input and output interface in communication with the master for receiving a data transaction request, an identifying unit that identifies a type of the data transaction, a control unit that selectively enables at least one of the first and second cuts based on the data transaction type, and a data processing unit that processes data to be read from or written to the enabled cut based on the data transaction type.

16 Claims, 9 Drawing Sheets

(56) References Cited

U.S. PATENT DOCUMENTS

| | | | |
|---|---|---|---|
| 8,245,109 B2 * | 8/2012 | Wickeraad | G06F 11/1008 714/763 |
| 8,873,329 B1 * | 10/2014 | Zheng | G11C 8/08 365/230.01 |
| 2009/0222620 A1 * | 9/2009 | Kanai | G06F 1/3225 711/104 |
| 2011/0296118 A1 * | 12/2011 | Carter | G06F 13/1678 711/154 |
| 2013/0198549 A1 | 8/2013 | Longnecker et al. | |
| 2014/0173170 A1 * | 6/2014 | Muralimanohar | G06F 13/16 711/102 |

OTHER PUBLICATIONS

Nam Sung Kim, K. Flautner, D. Blaauw and T. Mudge, "Drowsy instruction caches. Leakage power reduction using dynamic voltage scaling and cache sub-bank prediction," 35th Annual IEEE/ACM International Symposium on Microarchitecture, 2002. (MICRO-35). Proceedings., 2002, pp. 219-230. (Year: 2002).*

Geiger, Michael, McKee, Sally A., and Tyson, Gary S., "Drowsy Region-Based Caches: Minimizing Both Dynamic arid Static Power Dissipation", ACM 1-59593-018-3/05/0005, CF '05, May 4-6, 2005, Ischin, Italy, 2005.

* cited by examiner

METHOD FOR PERFORMING DATA TRANSACTION THAT SELECTIVELY ENABLES MEMORY BANK CUTS AND MEMORY DEVICE THEREFOR

BACKGROUND

The present invention relates to a method for performing a data transaction between a memory device and a master device, and a memory device therefor.

FIG. 1 shows a schematic block diagram of a conventional system 100 for transferring data between a memory subsystem 102 and a plurality of masters 104 via a bus 106. The memory subsystem 102 can be any memory chip or a sub-block within a SoC, which stores information in units of memory banks 108. Each memory bank 108 includes an even cut 110 that stores bytes in the form of a word aligned with even addresses, and an odd cut 112 that stores bytes in the form of a word aligned with odd addresses. The memory subsystem 102 includes a memory controller for performing data transactions between the masters 104 and the memory banks 108.

In a conventional multi-master, multi-bank memory controller architecture, a memory access request from one master 104 is routed to one of the memory banks 108 irrespective of memory width alignment. For example, in a narrow write transaction between a master 104 and a memory bank 108 where a transaction width is less than a width of the bus 106, a strobe signal is provided to mask unused data bits in the bus 106, while in a read transaction between the master 104 and the memory bank 108, the memory bank 108 is accessed fully based on width of the bus 106. The transaction width is determined based on a width of the transferred data.

FIG. 2 is a flow chart of a conventional method 200 for transferring data between the master 104 and the memory bank 108 of the memory subsystem 102 of FIG. 1. Starting at step 202, the memory controller 114 waits for a transaction request sent from the master 104. At step 204, upon receipt of the transaction request at an I/O interface of the memory controller 114, the memory controller 114 identifies if the transaction is a read transaction or a write transaction.

For a read transaction, at step 206, both the even and odd cuts 110 and 112 of the memory bank 108 are enabled. At step 208, the memory controller 114 reads data from both the even and odd cuts 110 and 112 together with an error correction code (ECC). At step 210, the memory controller 114 detects and corrects any ECC errors on both the even and odd cuts. Finally, at step 212, the memory controller 114 sends out corrected data and a response to the I/O interface of the memory controller 114.

On the other hand, for a write transaction request, at step 214, the memory controller 114 identifies if the write transaction is a narrow type write transaction. At step 216, for a narrow type write transaction, the memory controller 114 holds the write transaction for both the even and odd cuts 110 and 112. At step 218, the memory controller 114 initiates a read transaction for the two cuts 110 and 112, and at step 220, data read from the even and odd cuts 110 and 112 is merged with data being held for the write transaction. For a non-narrow type write transaction, step 222 is performed directly after step 214, where the ECC for the even and odd cuts 110 and 112 is calculated. For the narrow type write transaction, the ECC is calculated based on the merged data, while for the non-narrow type write transaction, the ECC is calculated based only on the data to be written to the memory bank 108. At step 224, the memory controller 114 enables both the even and odd cuts 110 and 112. At step 226, the data and ECC are written to both the even and odd cuts 110 and 112, where for the narrow type write transaction, the memory controller 114 writes the merged data and the ECC to the even and odd cuts 110 and 112, while for the non-narrow type write transaction, the memory controller 114 writes the data to be written to the memory bank 108 as well as the ECC to the even and odd cuts 110 and 112. Finally, at step 228, a response is sent to the I/O interface of the memory controller 114.

FIG. 3 is a conventional state machine 300 of a write transaction performed by the memory controller 114. Initially the memory controller 114 is in an idle state 302 via transition 304 if no valid write transaction request is received. Upon receipt of a write transaction request, (i) if only a write address in a memory bank 108 is valid, the memory controller 114 moves to an acknowledge state (W_ACK) 306 via transition 308 to acknowledge the receipt of the write address and wait for write data, (ii) if both the write address and write data are valid, and the transaction length is more than one, the memory controller 114 moves to a first memory access state (W_CS) 310 via transition 312 to access the memory bank 108 and write the write data of a non-last write transaction of the ongoing transaction, or (iii) if both the write address and write data are valid, but the transaction length is one, the memory controller 114 moves to a second memory access state (W_CSL) 314 via transition 316 to access the memory bank 108 and write the write data of a last write transaction clock cycle of the ongoing transaction.

In the W_ACK state 306, the memory controller 114 (i) remains in the W_ACK state 306 via transition 318 if the write data is not valid, (ii) moves to the W_CS state 310 via transition 320 if the write data for the first but not the last write transaction of the ongoing transaction is valid, or (iii) moves to the W_CSL state 314 via transition 322 if the write data for the last write transaction of the ongoing transaction is valid.

In the W_CS state 310, the memory controller 114 (i) remains in the W_CS state 310 via transition 324 until the last write transaction of the ongoing transaction, or (ii) moves to the W_CSL state 314 via transition 326 in the last write transaction of the ongoing transaction.

In the W_CSL state 314, the memory controller 114 (i) remains in the W_CSL state 314 via transition 328 if a new write transaction request together with the write address and write data are valid, and the transaction length is one, (ii) moves to the W_CS state 310 from the W_CSL state 314 via transition 330 if the new write transaction request together with the write address and write data are valid, and the transaction length is more than one, (iii) moves back to the W_ACK state 306 via transition 332 to wait for the write data if only the new write transaction request and the write address are valid, or (iv) moves back to the IDLE state 302 from the W_CSL state 314 via transition 334 if there is no new valid write transaction request.

As can be seen from the flow chart of the conventional method 200 and the state machine 300, both the even and odd cuts 110 and 112 of the memory bank 108 are enabled regardless of the transaction type, and the memory subsystem 102 remains in a single power-on mode in the write transaction regardless of the validity of the write data, which results in high dynamic and leakage power consumption. It is therefore desirable to find a method for reducing power consumption by the memory.

BRIEF DESCRIPTION OF THE DRAWINGS

The invention, together with objects and advantages thereof, may best be understood by reference to the following description of preferred embodiments together with the accompanying drawings in which.

DETAILED DESCRIPTION OF PREFERRED EMBODIMENTS

Figure 1:
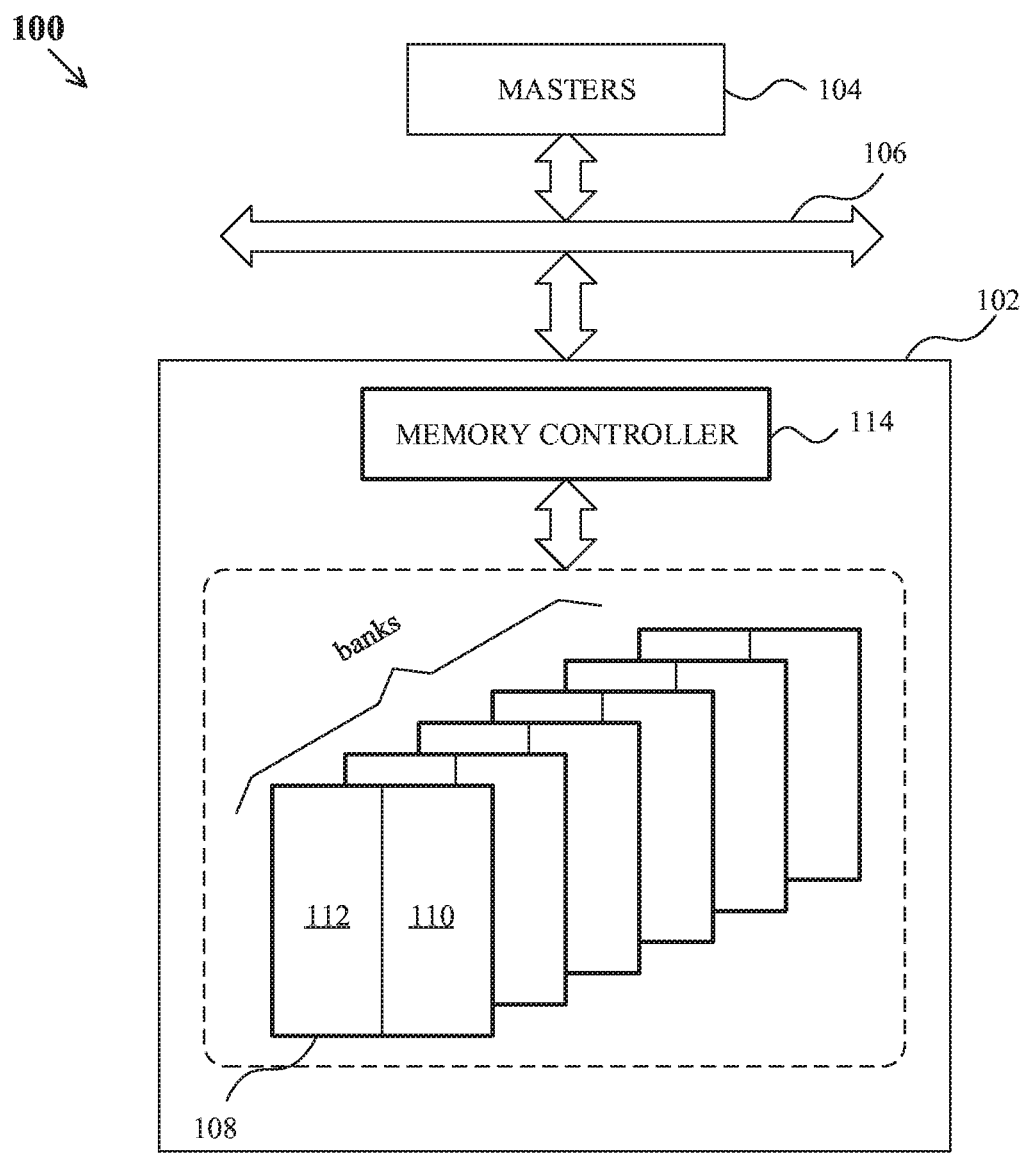
FIG. 1 is a schematic block diagram of a conventional system for transferring data between a memory and a master via a bus.
Figure 2:
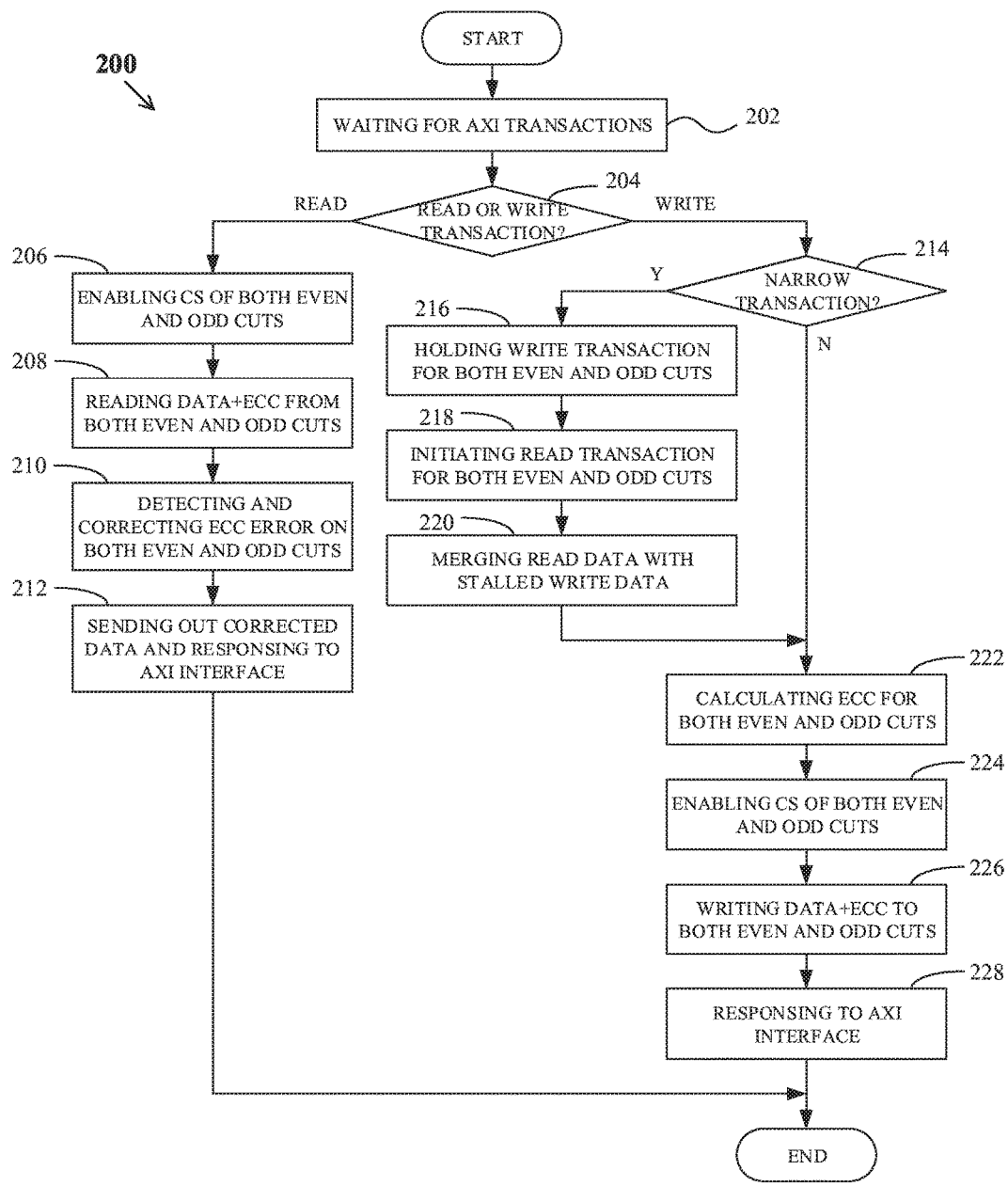
FIG. 2 is a flow chart of a conventional method for transferring data between a memory and a master.
Figure 3:
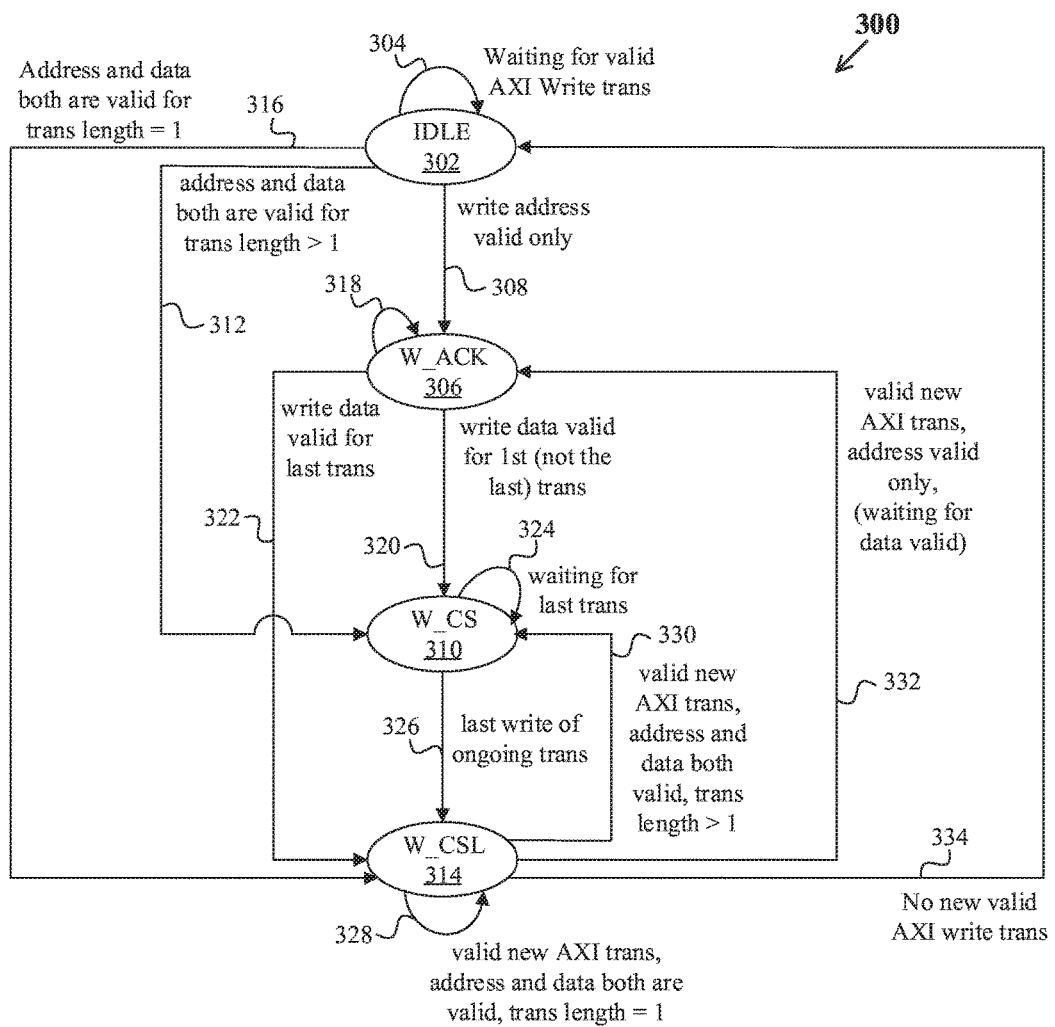
FIG. 3 is a conventional state machine of a write transaction.

The detailed description set forth below in connection with the appended drawings is intended as a description of presently preferred embodiments of the invention, and is not intended to represent the only forms in which the present invention may be practised. It is to be understood that the same or equivalent functions may be accomplished by different embodiments that are intended to be encompassed within the spirit and scope of the invention. In the drawings, like numerals are used to indicate like elements throughout. Furthermore, terms "comprises," "comprising," or any other variation thereof, are intended to cover a non-exclusive inclusion, such that module, circuit, device components, structures and method steps that comprises a list of elements or steps does not include only those elements but may include other elements or steps not expressly listed or inherent to such module, circuit, device components or steps. An element or step proceeded by "comprises . . . a" does not, without more constraints, preclude the existence of additional identical elements or steps that comprises the element or step.

In one embodiment, the present invention provides a system for performing a data transaction between a memory and a master via a bus based on a strobe signal. The memory includes at least one memory bank having first and second cuts. The data transaction is either a read transaction or a write transaction. The system includes an input and output (I/O) interface in communication with the master that receives a data transaction request, an identifying unit connected to the I/O interface that identifies a type of the data transaction. The data transaction is identified as a narrow type transaction if a transaction width is less than a width of the bus. A control unit connected to the identifying unit selectively enables at least one of the first and second cuts based on the data transaction type, and a data processing unit connected to the control unit processes data to be read from or written to the enabled cut based on the data transaction type.

In another embodiment, the present invention provides a method for performing a data transaction between a memory and a master via a bus based on a strobe signal. The memory includes at least one memory bank having first and second cuts. The data transaction is either a read transaction or a write transaction. The method includes receiving a data transaction request, identifying if the data transaction is a read transaction or a write transaction based on the request, and identifying a type of the data transaction. The data transaction is identified as a narrow type transaction if a transaction width is less than a width of the bus. The method also includes selectively enabling at least one of the first and second cuts based on the data transaction type, processing data to be read from or written to the enabled one of the first and second cuts based on the data transaction type, and performing the data transaction between the enabled one of the first and second cuts and the master.

Figure 4:
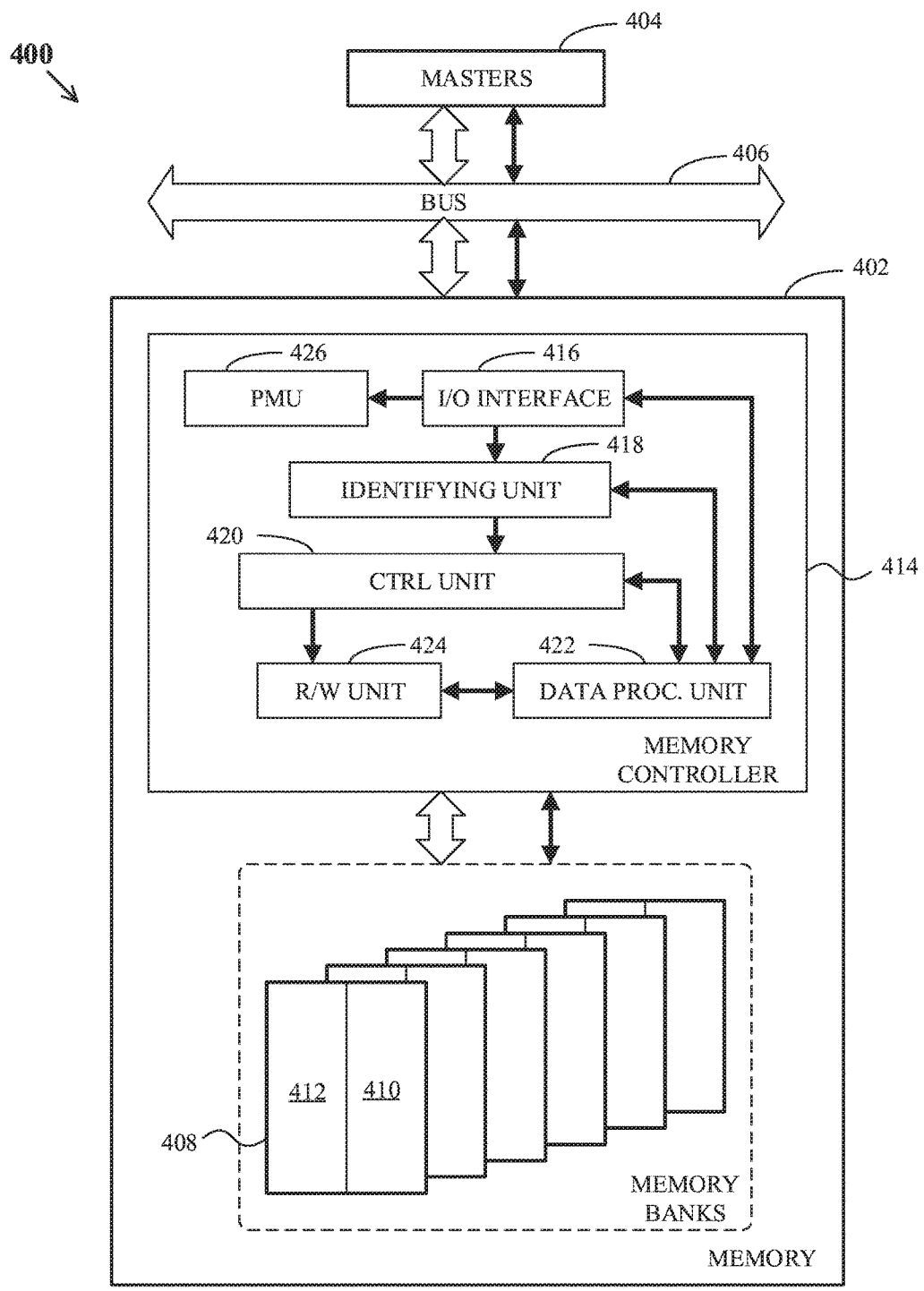
FIG. 4 is a schematic block diagram of a system for transferring data between a memory and a master in accordance with an embodiment of the invention.

Referring now to FIG. 4, a schematic block diagram of a system 400 for transferring data between a memory subsystem 402 and a plurality of masters 404 via a bus 406 in accordance with an embodiment of the invention is shown. The memory subsystem 402 can be a memory device such as a random-access memory (RAM) that includes a plurality of memory banks, and the masters 404 can be a processor like a CPU or an MCU.

The memory subsystem 402 comprises a plurality of memory banks 408 each having first and second cuts 410 and 412, and a memory controller 414 connected to the memory banks 408 for performing data transactions. In this application, memory cut refers to a half portion of a memory bank that stores N-bytes word aligned with even or odd addresses, where N is data width of the memory cut. The memory controller 414 is preferably an on-chip MCU of the memory subsystem 402, and each memory bank 408 has a pre-configured size. In a preferred embodiment, the first cut 410 is an even cut of the memory bank 408 that stores a N-bytes word aligned with even addresses, and the second cut is an odd cut of the memory bank 408 that stores a N-bytes word aligned with odd addresses. The memory controller 414 comprises an input and output (I/O) interface 416 in communication with the plurality of masters 404 that receives a data transaction request for transferring data between a master 404 and a memory bank 408, and an identifying unit 418 connected to the I/O interface 416 that identifies a type of the data transaction. The data transaction is identified as a narrow type transaction if its transaction width is less than a width of the bus 406. For example, if the width of the bus 406 is 128 bits, and the transaction width is 64 bits, 32 bits, 16 bits, or 8 bits depending on the data to be transferred, then the transaction is considered to a narrow transaction. In a preferred embodiment, the I/O interface 416 is an Advanced eXtensible Interface (AXI). The memory controller 414 further includes a control unit 420 connected to the identifying unit 418 that selectively enables at least one of the first and second cuts 410 and 412 based on the data transaction type, a data processing unit 422 connected to the control unit 420 that processes data to be read from or written to the enabled cut based on the data transaction type, and a reading and writing (R/W) unit 424 connected to the control unit 420 and the data processing unit 422 that performs the data transaction between the enabled cut and the master 404. In a preferred embodiment, the data processing unit 422 further buffers data to be written to or read from the memory bank 408. In a preferred embodiment, enabling a cut comprises asserting a chip selecting (CS) signal corresponding to the cut.

In a preferred embodiment, for a narrow type write transaction, the memory controller 414 performs the write transaction to the first and second cuts 410 and 412 of the memory bank 408 in a parallel, symmetric and interlocking manner based on a strobe signal provided by the master 404. The strobe signal comprises a plurality of bits each corresponding to a byte in the memory bank 408 that indicates if there is data to be written to the corresponding byte. The identifying unit 418 further respectively identifies bits in the strobe signal corresponding to the first and second cuts 410 and 412.

Taking the first cut 410 as an example, if in the strobe signal, none of the bits corresponding to the bytes in the first cut 410 is asserted, then (i) the data processing unit 422 generates a first release signal to release data to be written to the second cut 412, and (ii) the control unit 420 keeps the first cut 410 disabled and enables the second cut 412 upon receipt of the first release signal.

If in the strobe signal, one or more but not all of the bits corresponding to the bytes in the first cut 410 is selected, then the R/W unit 424 reads data previously stored in the first cut 410, and buffers the read data in the data processing unit 422, the data processing unit 422 (i) then merges the data previously stored in the first cut 410 with data to be written to the first cut 410 that is buffered in the data processing unit 422 based on the strobe signal, (ii) calculates a first error correcting code for the first cut 410 based on the merged data, and (iii) generates the first release signal, and the control unit 420 enables the first cut 410. The R/W unit 424 then writes the merged data and the first error correcting code to the first cut 410, and responses to the I/O interface 416.

If in the strobe signal, the bits corresponding to the bytes in the first cut 410 are all selected, then the data processing unit 422 buffers the data to be written to the first cut 410, and calculates a second ECC for the first cut 410 based on the buffered data to be written to the first cut 410, and the control unit 420 enables the first cut 410 upon receipt of a second release signal generated by the data processing unit 422 to release the data to be written to the first cut 410. The second release signal is generated if none of the bits in the strobe signal corresponding to the second cut 420 is selected, or if the data processing unit 422 has (i) merged data previously stored in the second cut 412 with data to be written to the second cut 412, and (ii) calculated a third ECC for the second cut 412 based on the merged data to be written to the second cut 412. The R/W unit 424 writes the buffered data to be written to the first cut 410 and the second error correcting code to the first cut 410, and responses to the I/O interface 416.

In a preferred embodiment, for a non-narrow type write transaction, the data processing unit 422 calculates an ECC for both the first and second cuts 410 and 412, and enables the two cuts 410 and 412. The R/W unit 424 writes the data to be written to the memory bank 408 and the ECC to the memory bank 408, and responds to the I/O interface 416.

In a preferred embodiment, for a narrow type read transaction, the control unit 420 only enables one of the first and second cuts 410 and 420 that data is to be read from, the reading and writing unit 424 reads data and an ECC from the enabled one of the first and second cuts 410 and 412, and the data processing unit 422 detects and corrects errors in the read data and provides (i) corrected data as data read from the enabled one of the first and second cuts 410 and 412, and (ii) zeros as data read from the other one of the first and second cuts 410 and 412 to the I/O interface 416.

For a non-narrow type read transaction, if data to be read from the memory bank 408 is only located in the odd cut 412, the control unit 420 enables only the odd cut 412, the reading and writing unit 424 reads data and an ECC from the odd cut 412 only, detects and corrects errors on the odd cut 412 only, and provides the corrected data to the I/O interface 416. If the data to be read from the memory bank 408 is not only located in the odd cut 412, the control unit 420 enables both the even and odd cuts 410 and 412, the reading and writing unit 424 reads data and an ECC from the two cuts 410 and 412, detects and corrects errors on both of the two cuts 410 and 412, and provides the corrected data to the I/O interface 416.

Therefore, in a narrow type transaction, power consumption is decreased by selectively enabling the first and second cuts 410 and 412 of the memory bank 408 based on transaction profiling.

In a preferred embodiment, the memory controller 414 further comprises a power management unit 426 connected to the I/O interface 416 that initially configures the memory banks 408 to a low power mode, and upon receipt of a valid data transaction request, generates a power-up signal to a corresponding memory bank 408 at least one clock cycle before the corresponding memory bank 408 is accessed, thereby allowing time to change the corresponding memory bank 408 from the low power mode to a normal operation mode.

Figure 5:
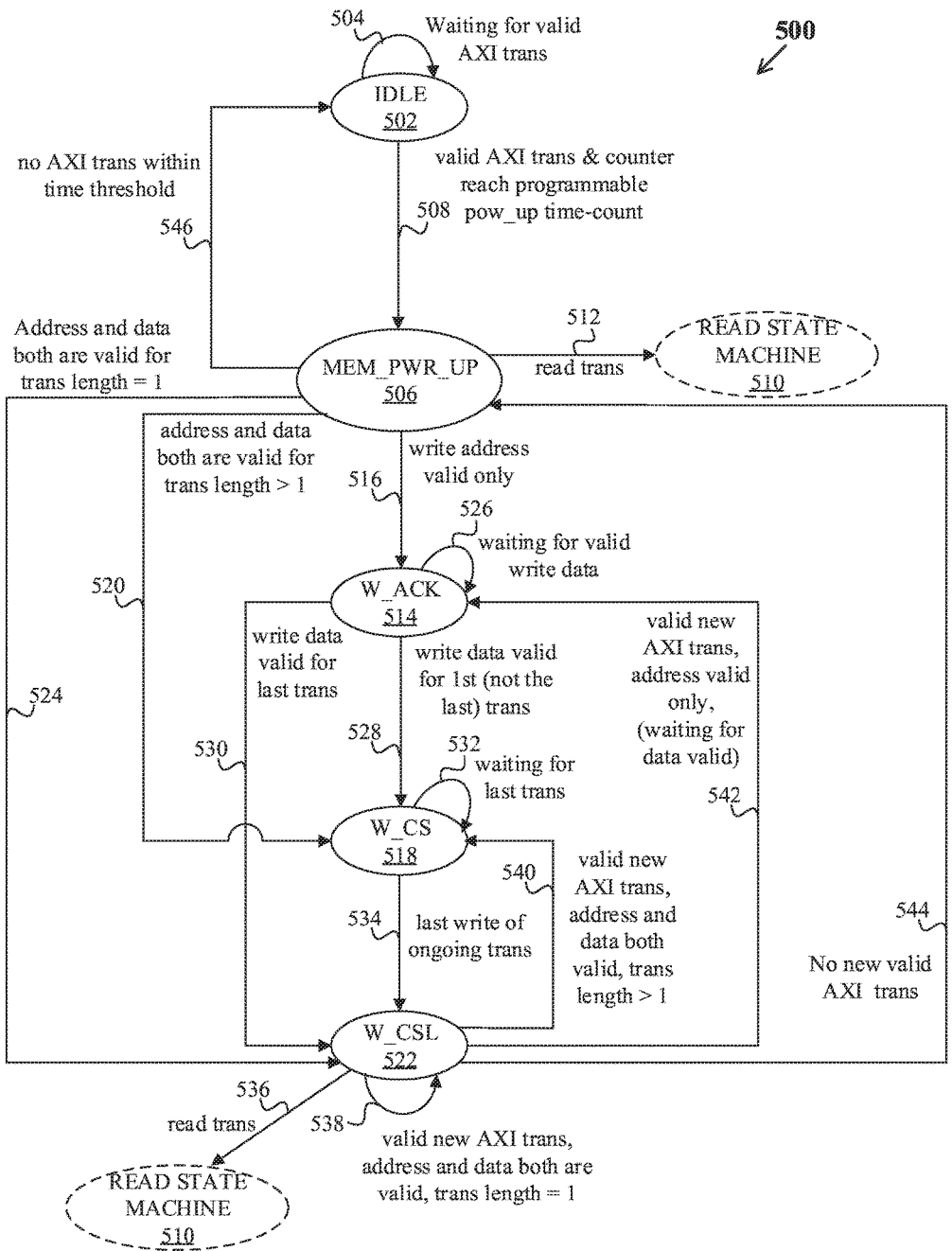
FIG. 5 is a state machine for gating memory power based on profile of a transaction in accordance with an embodiment of the invention.

Referring to FIG. 5, a diagram of a state machine 500 operated by the power management unit 426 of the memory controller 414 for gating memory power based on profile of a transaction in accordance with an embodiment of the invention is shown.

Starting from an idle state 502, the memory controller 414 remains in the idle state 502 via transition 504 if no valid transaction request is received and a predetermined time threshold has not been reached. In a preferred embodiment, in the idle state 502, the memory banks are initially configured to a low power mode. Upon receipt of a valid transaction request to read from or write to a memory bank 408, the power management Unit 426 starts to power up the memory bank 408 by moving to a memory power up state 506, based on the valid transaction request as well as a counter that has reached a programmable power-up count via transition 508. The counter is triggered upon receipt of the valid transaction request and the programmable power-up count is preconfigured based on the memory provided by different manufacturers, e.g., one or two clock cycles, which is the time for the memory to come out of the low-power mode.

Once the memory bank 408 is powered up, if the transaction request is a read transaction request, the memory controller 414 moves to a read state machine 510 via transition 512 to perform a read transaction, or for a write transaction request, (i) if only a write address is valid, the memory controller 414 moves to an acknowledge state (W_ACK) 514 via transition 516 to acknowledge the receipt of the write address and wait for write data, (ii) if both the write address and write data are valid, and the transaction length is more than one, the memory controller 414 moves to a first memory access state (W_CS) 518 via transition 520 to access the memory bank 408 and write the write data of a non-last write transaction of the ongoing write transaction, or (iii) if both the write address and write data are valid, and the transaction length is one, the memory controller 414 moves to a second memory access state (W_CSL) 522 via transition 524 to access the memory bank 408 and write the write data of a last write transaction clock cycle of the ongoing write transaction. Also at the memory power up state 506, if no AXI bus transaction is received within a predetermined time threshold, then the memory controller 414 returns to the idle state 502 via transition 546.

In the W_ACK state 514, the memory controller 414 (i) remains in the W_ACK state 514 via transition 526 if the write data is not valid, (ii) moves to the W_CS state 518 via transition 528 if the write data for the first but not the last write transaction of the ongoing write transaction is valid, or (iii) moves to the W_CSL state 522 via transition 530 if the write data for the last write transaction of the ongoing write transaction is valid.

In the W_CS state 518, the memory controller 414 (i) remains in the W_CS state 518 via transition 532 until the last write transaction of the ongoing write transaction, (ii) moves to the W_CSL state 522 via transition 534 in the last write transaction of the ongoing write transaction.

In the W_CSL state 522, the memory controller 414 moves to the read state machine 510 via transition 536 to perform a read transaction upon receive a read transaction request, or (i) remains in the W_CSL state 522 via transition 538 if a new write transaction request together with the write address and write data are valid, and the transaction length is one, (ii) moves to the W_CS state 518 via transition 540 if a new write transaction request together with the write address and write data are valid, and the transaction length is more than one, (iii) moves back to the W_ACK state 514 via transition 542 to wait for the write data if only a new write transaction request and the write address are valid, or (iv) moves back to the memory power up state 506 via transition 544 if there is no new valid transaction request. In the memory power up state 506, the memory controller 414 moves back to the idle state 502 if no valid transaction request is received within the predetermined time threshold, where the power management unit 426 configures the memory bank 408 to the low power mode.

Therefore, by using the power management unit 426 to dynamically configure the memory banks 408 to the low power mode, and power up the memory banks 408 at least one transaction before the memory banks 408 are accessed upon receipt of the write transaction request, power consumption is reduced when there is no valid transaction request.

FIGS. 6-9 show a flow chart of a method 600 for transferring data between the memory subsystem 402 and the maters 404 of FIG. 4 in accordance with an embodiment of the invention.

The memory subsystem 402 comprises a plurality of memory banks 408 each having an even cut 410 and an odd cut 412, and a memory controller 414 connected to the memory banks 408 for performing data transactions. In a preferred embodiment, each memory bank 408 has a pre-configured size, the even cut 410 stores bytes with even addresses, and the odd cut stores bytes with odd addresses. The masters 404 can be a processor like a CPU or a MCU, and the memory subsystem 402 can be a memory device such as a random-access memory (RAM) includes a plurality of memory banks. The memory controller 414 can be an on-chip MCU of the memory subsystem 402.

Figure 6:
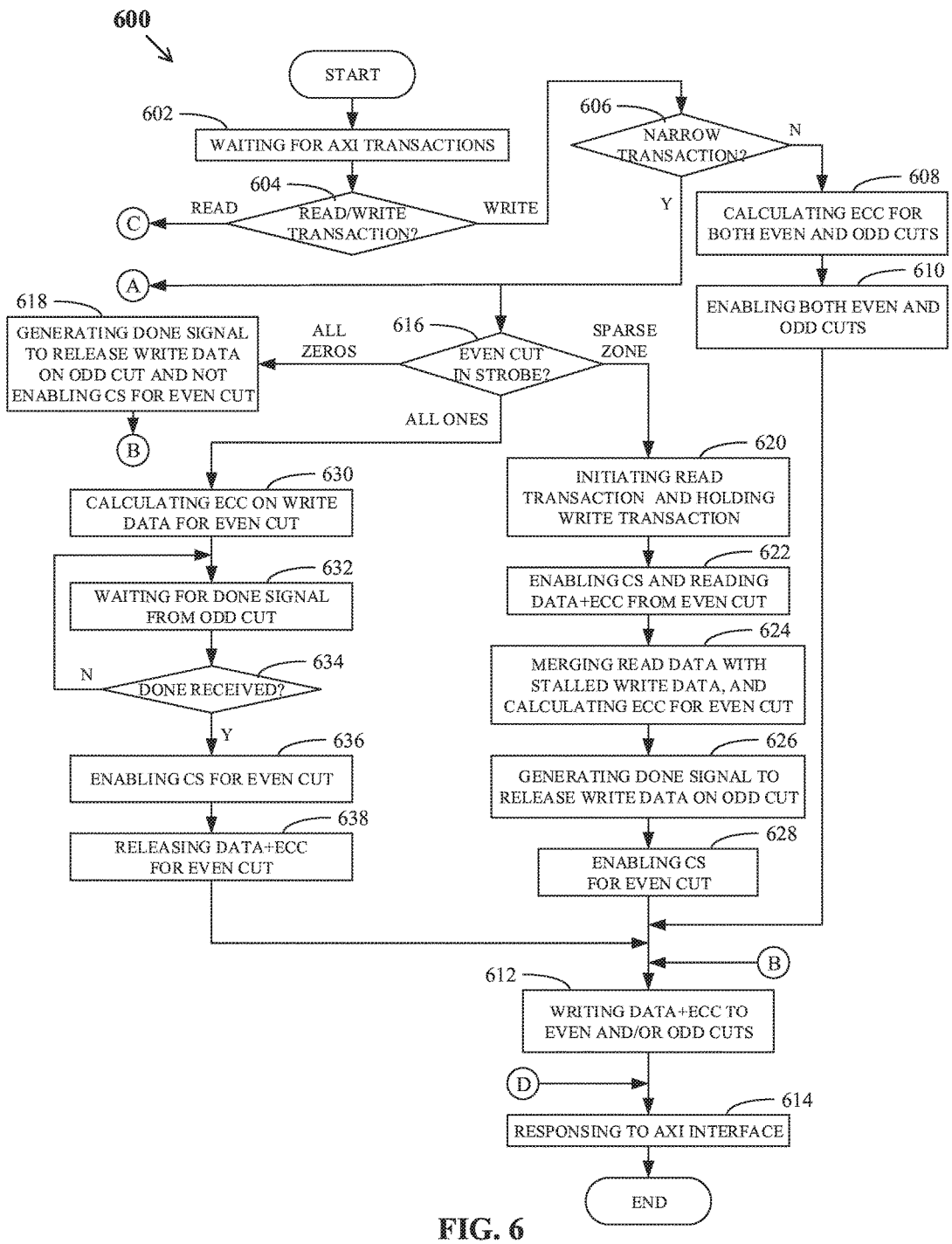
FIGS. 6-9 show a flow chart of a method for transferring data between a memory and a master in accordance with an embodiment of the invention.

Referring to FIG. 6, starting from step 602, the memory controller 414 waits for data transaction requests from the masters 404. At step 604, upon receipt of a data transaction request for transferring data between a master 404 and a memory bank 408 through the I/O interface 416, the identifying unit 418 identifies if the data transaction request is a write transaction request or a read transaction request. At step 606, if the data transaction request is a write transaction request, a type of the write transaction is further identified. The write transaction is identified as a narrow type write transaction if its transaction width is less than a width of the bus 406. For example, when the width of the bus 406 is 128 bits and the transaction width is 64 bits, 32 bits, 16 bits, or 8 bits depending on the data to be transferred. In a preferred embodiment, for a write transaction, data to be written to the memory bank 408 is buffered in the memory controller 414.

At step 608, if the write transaction is not a narrow type write transaction, an ECC for both the even and odd cuts 410 and 412 is calculated, and at step 610, both the even and odd cuts 410 and 412 are enabled. In a preferred embodiment, a cut is enabled by asserting a chip selecting (CS) signal corresponding to the cut.

At step 612, the buffered data and the ECC are written to the memory bank 408, and at step 614, a response is sent to the I/O interface 416.

If the write transaction is a narrow type write transaction, the write transaction is performed to the even and odd cuts 410 and 412 of the memory bank 408 in a parallel, symmetric and interlocking manner based on a strobe signal provided by the master 404 for writing the data to the memory bank 408. The strobe signal comprises a plurality of bits each corresponding to a byte in the memory bank 408 that indicates if there is data to be written to the corresponding byte.

Taking the even cut 410 as an example, at step 616, bits in a strobe signal corresponding to the even cut 410 are identified.

At step 618, if in the strobe signal, none of the bits corresponding to the bytes in the even cut 410 is asserted, a first release signal is generated to release data to be written to the odd cut 412, the even cut 410 is kept disabled, and the odd cut 412 is enabled. Then the steps 612 and 614 are performed.

At step 620, if in the strobe signal, one or more but not all of the bits corresponding to the bytes in the even cut 410 is selected, that is, the bits in the strobe signal corresponding to the even cut is a sparse zone, at step 620, a read transaction is initiated to read data previously stored in the even cut 410, and the write transaction is held. At step 622, the even cut 410 is enabled and data previously stored in the even cut 410 and a corresponding ECC are read and buffered in the memory controller 414. At step 624, the buffered data is merged with data to be written to the even cut 410, and a first ECC of the merged data is calculated for the even cut 410. At step 626, the first release signal is generated to release data to be written to the odd cut 412, and at step 628 the even cut 410 is enabled for the write transaction. The R/W unit 424 then writes the merged data and the first ECC to the even cut 410, and responses to the I/O interface 416, followed by the steps 612 and 614.

At step 630, if in the strobe signal, the bits corresponding to the bytes in the even cut 410 are all selected, a second ECC for the even cut 410 is calculated based on the data to be written to the even cut 410. At step 632, the memory controller 414 waits for a second release signal generated based on the odd cut 412 that is generated to release the data to be written to the even cut 410. In a preferred embodiment, the second release signal is generated if none of the bits in the strobe signal corresponding to the odd cut 420 is selected, or if (i) data previously stored in the odd cut 412 has been merged with the data to be written to the odd cut 412, and (ii) a third ECC for the odd cut 412 has been calculated based on the merged data for the odd cut 412. At step 634, the memory controller 414 detects if the second release signal is valid, and at step 636, upon receipt of the second release signal, the even cut 410 is enabled. At step 638, the data to be written to the even cut 410 and the second ECC for the even cut 410 are released for a write transaction, followed by the steps 612 and 614.

Figure 7:
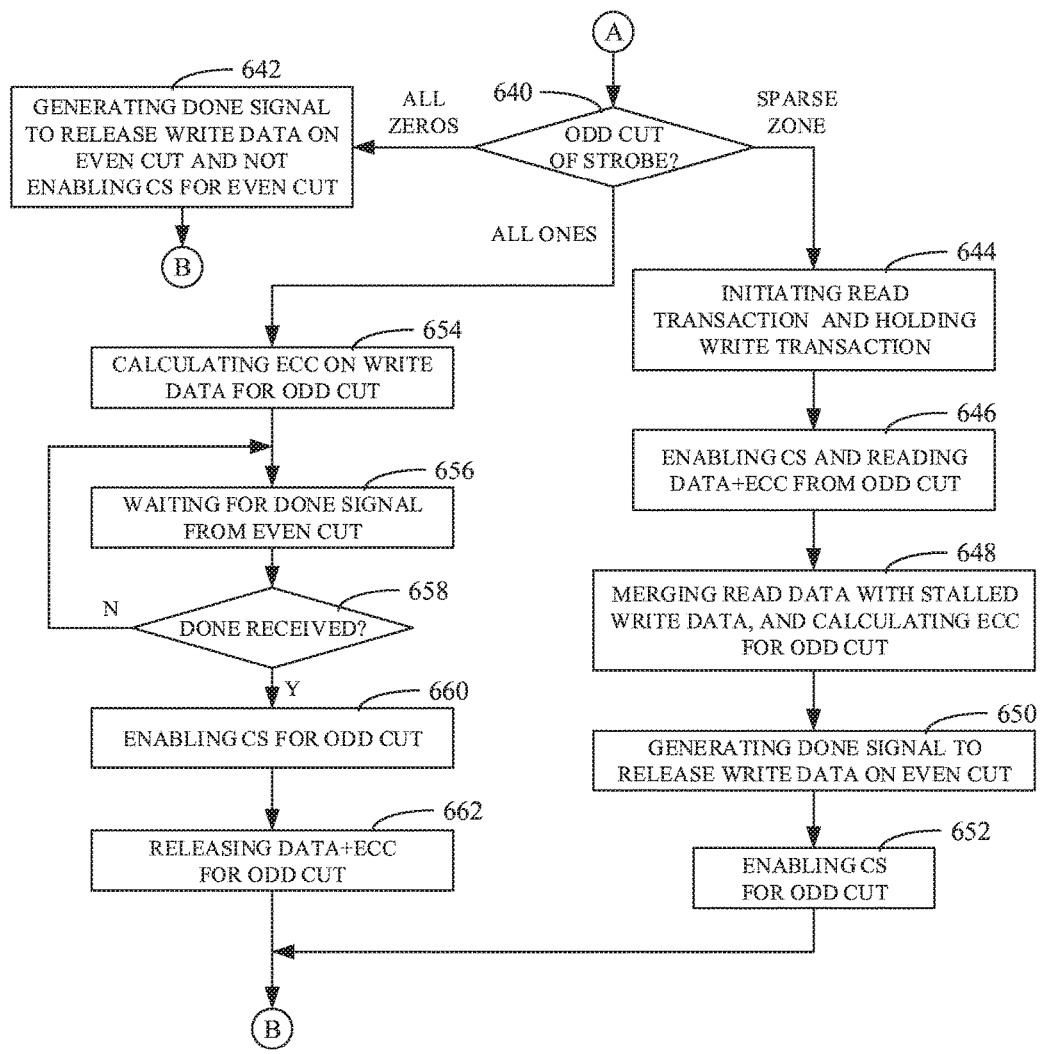

Referring to FIG. 7, as mentioned above, for the narrow type write transaction, the write transaction is performed on the even and odd cuts 410 and 412 of the memory bank 408 in a parallel, symmetric and interlocking manner. Thus steps 640-662 for the odd cut 412 are similar and symmetric to the steps 616-638 of FIG. 6.

Figure 8:
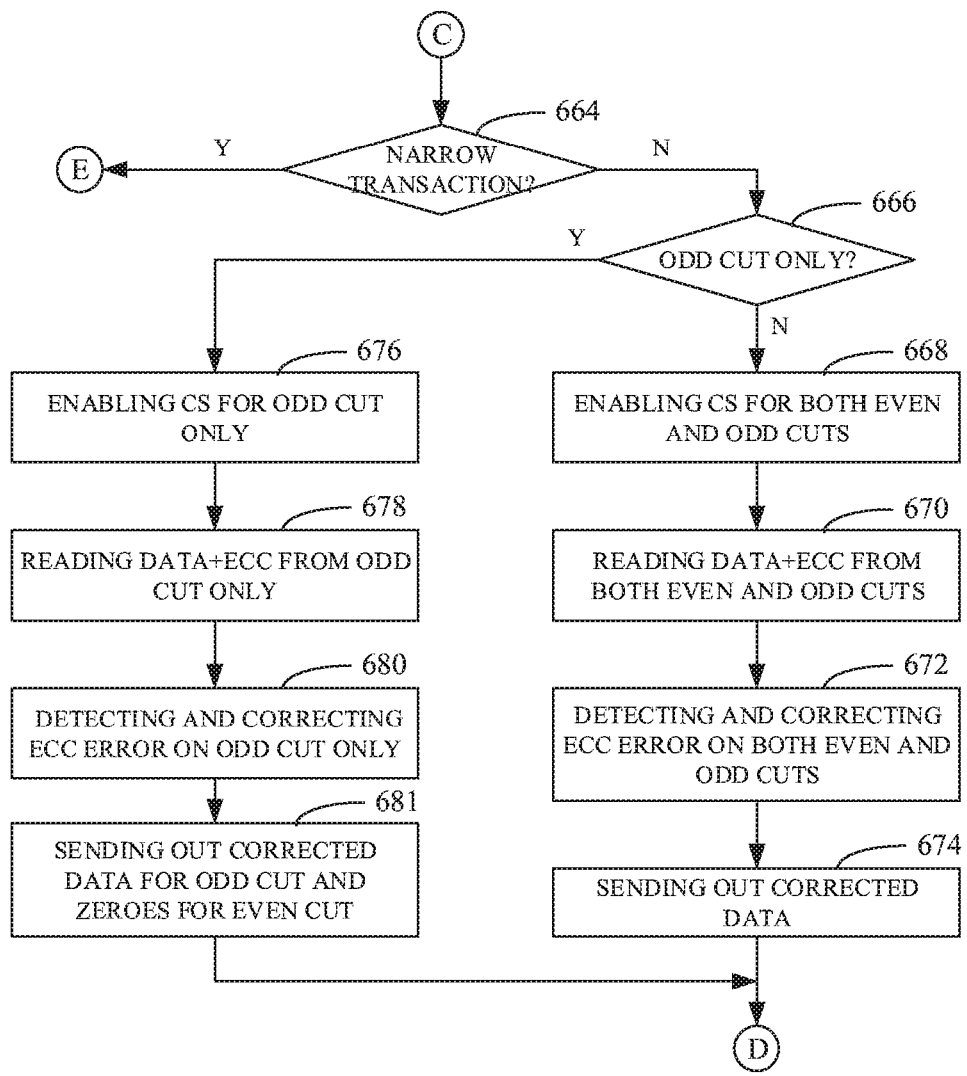

Referring to FIG. 8, at step 664, for a read transaction, a type of the read transaction is identified, where the read transaction is identified as a narrow type read transaction if its transaction width is less than a width of the bus 406.

At step 666, if the read transaction is not a narrow type read transaction, a location of the data to be read is identified.

At step 668, if the data to be read from the memory bank 408 is not located only in the odd cut 412, both of the even and odd cuts 410 and 412 are enabled. At step 670, data and an ECC are read from the two cuts 410 and 412, and at step 672, ECC errors on both of the cuts 410 and 412 are detected and corrected. At step 674, the corrected data is sent out through the I/O interface 416, and then at step 614, a response is sent to the I/O interface 416.

At step 676, if the data to be read from the memory bank 408 is only located in the odd cut 412, only the odd cut 412 is enabled. At step 678, data and an ECC are read from the odd cut 412 only, and at step 680, only ECC errors on the odd cut 412 are detected and corrected, followed by steps 674 and 614. At step 681, the corrected data as data read from the odd cut 410, and zeros as data read from the even cut 410 are sent out through the I/O interface 416.

Figure 9:
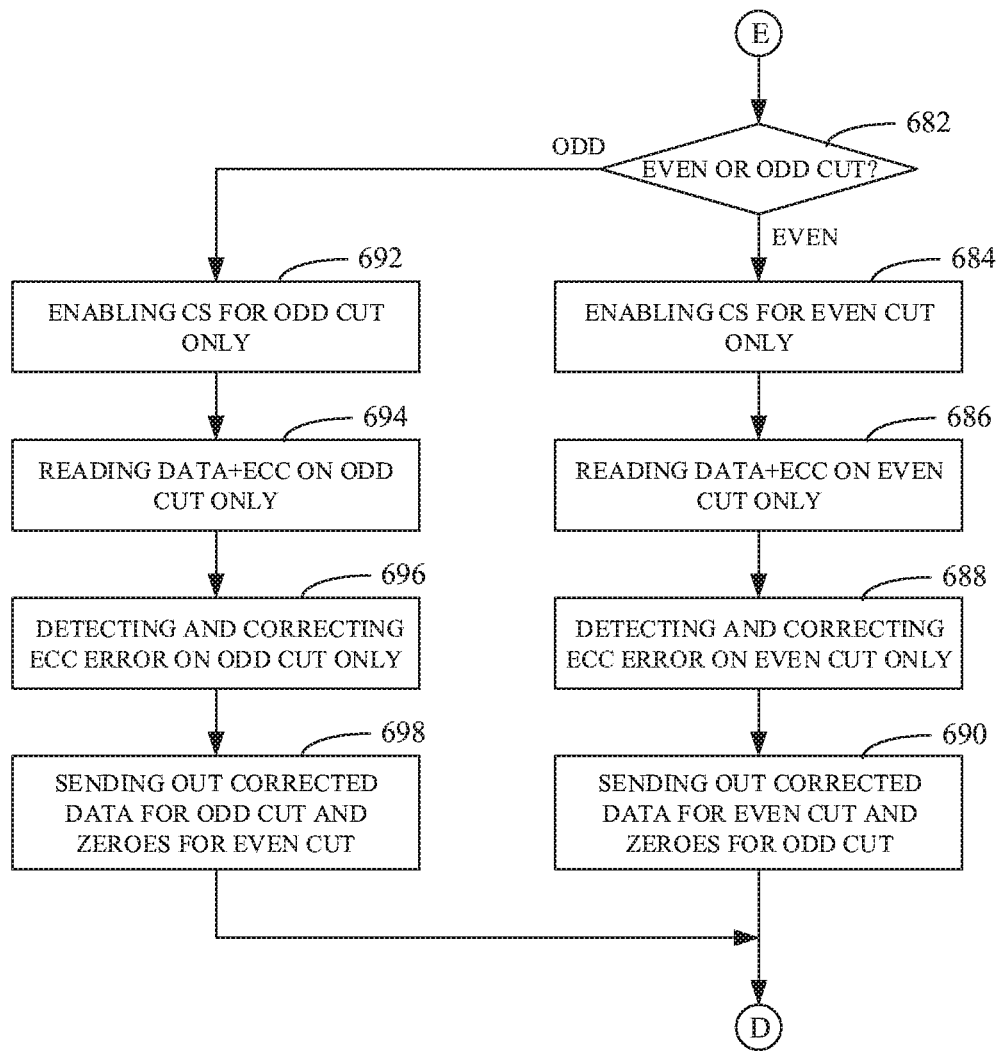

Referring to FIG. 9, at step 682, for a narrow type read transaction, a location of the data to be read is identified. At step 684, if the data to be read from the memory bank 408 is located in the even cut 410, only the even cut 410 is enabled. At step 686, data and an ECC are read from the even cut 410 only, and at step 688, only ECC errors on the even cut 410 are detected and corrected. Then at step 690, the corrected data as data read from the even cut 410, and zeros as data read from the odd cut 412 are sent out through the I/O interface 416, followed by the step 614.

If the data is located in the odd cut 412, steps 692-698 are performed, which are similar and symmetric to steps 684-690.

Therefore, by selectively enabling the even and odd cuts 410 and 412 based on the data transaction type, dynamic and leakage power consumption of the memory subsystem 402 is reduced.

The description of the preferred embodiments of the present invention has been presented for purposes of illustration and description, but is not intended to be exhaustive or to limit the invention to the forms disclosed. It will be appreciated by those skilled in the art that changes could be made to the embodiments described above without departing from the broad inventive concept thereof. It is understood, therefore, that this invention is not limited to the particular embodiment disclosed, but covers modifications within the spirit and scope of the present invention as defined by the appended claims.

The invention claimed is:

1. A system for performing a data transaction between a memory and a master device via a bus based on a strobe signal, wherein the memory comprises at least one memory bank including first and second cuts, and wherein the data transaction comprises one of a read transaction and a write transaction, the system comprising:
   an input and output interface in communication with the master device that receives a data transaction request;
   an identifying unit connected to the input and output interface that identifies a type of the data transaction, wherein the data transaction is identified as a narrow type transaction if a transaction width is less than a width of the bus, wherein for a narrow type write transaction, the identifying unit further identifies bits in the strobe signal corresponding to the first and second cuts;
   a control unit connected to the identifying unit that selectively enables at least one of the first and second cuts based on the data transaction type; and
   a data processing unit connected to the control unit that processes data to be read from or written to the enabled cut based on the data transaction type.

2. The system of claim 1, further comprising a reading and writing unit that reads from or writes to the enabled cut.

3. The system of claim 1, wherein if in the strobe signal, none of the bits corresponding to the first cut are selected, then (i) the data processing unit generates a first release signal to release data to be written to the second cut, and (ii) the control unit keeps the first cut disabled and enables the second cut upon receipt of the first release signal.

4. The system of claim 3, wherein if in the strobe signal, one or more but not all of the bits corresponding to the first cut are selected, then the data processing unit (i) merges data previously stored in the first cut with data to be written to the first cut, (ii) calculates a first error correcting code for the first cut based on the merged data, and (iii) generates the first release signal, and the control unit enables the first cut.

5. The system of claim 4, wherein if in the strobe signal, the bits corresponding to the first cut are all selected, then the data processing unit calculates a second error correction code for the first cut based on data to be written to the first cut, and the control unit enables the first cut upon receipt of a second release signal generated by the data processing unit to release the data to be written to the first cut,
   wherein the second release signal is generated if none of the bits in the strobe signal corresponding to the second cut are selected, or
   if the data processing unit has (i) merged data previously stored in the second cut with the data to be written to the second cut, and (ii) calculated a third error correcting code for the second cut based on the merged data.

6. The system of claim 1, wherein the first cut is an even cut of the at least one memory bank that stores bytes in the form of a word and aligned with even addresses, and the second cut is an odd cut of the at least one memory bank that stores bytes in the form of a word and aligned with odd addresses, wherein for a non-narrow type read transaction, the control unit enables only the odd cut if data to be read from the memory bank is only located in the odd cut.

7. The system of claim 1, further comprising a power management unit connected to the input and output interface, wherein upon receipt of a valid data transaction request, the power management unit generates a power-up signal to the at least one memory bank that is in a low power mode at least one clock cycle before the at least one memory bank is accessed, thereby allowing time to configure the at least one memory bank from the low power mode to a normal operation mode, and configures the at least one memory bank back to the low power mode if no new valid data transaction request has been received within a predetermined time threshold after a last transaction of the valid data transaction request.

8. A system for performing a data transaction between a memory and a master device via a bus based on a strobe signal, wherein the memory comprises at least one memory bank including first and second cuts, and wherein the data transaction comprises one of a read transaction and a write transaction, the system comprising:

an input and output interface in communication with the master device that receives a data transaction request;

an identifying unit connected to the input and output interface that identifies a type of the data transaction, wherein the data transaction is identified as a narrow type transaction if a transaction width is less than a width of the bus;

a control unit connected to the identifying unit that selectively enables at least one of the first and second cuts based on the data transaction type; and a data processing unit connected to the control unit that processes data to be read from or written to the enabled cut based on the data transaction type, wherein for a narrow type read transaction, the control unit only enables one of the first and second cuts that data is to be read from, the reading and writing unit reads the data from the enabled one of the first and second cuts, and the data processing unit detects and corrects errors in the data read from the one of the first and second cuts and provides (i) corrected data as data read from the enabled one of the first and second cuts, and (ii) zeros as data read from the other one of the first and second cuts.

9. A method for performing a data transaction between a memory and a master device via a bus based on a strobe signal, wherein the memory comprises at least one memory bank including first and second cuts, and wherein the data transaction comprises one of a read transaction and a write transaction, the method comprising:

receiving a data transaction request;

identifying if the data transaction is the read transaction or the write transaction based on the request;

identifying a type of the data transaction, wherein the data transaction is identified as a narrow type transaction if a transaction width is less than a width of the bus;

selectively enabling at least one of the first and second cuts based on the data transaction type;

processing data to be read from or written to the enabled one of the first and second cuts based on the data transaction type; and performing the data transaction between the enabled cut and the master device, wherein for the narrow type write transaction, the method includes identifying bits in the strobe signal corresponding to the first and second cuts.

10. The method of claim 9, wherein if in the strobe signal, none of the bits corresponding to the first cut are selected, the method comprises:

keeping the first cut disabled, generating a first release signal to release data to be written to the second cut, and enabling the second cut based on the first release signal.

11. The method of claim 10, wherein if in the strobe signal, one or more but not all of the bits corresponding to the first cut are selected, the method comprises:

merging data previously stored in the first cut with data to be written to the first cut, calculating a first error correcting code for the first cut based on the merged data, generating the first release signal, and enabling the first cut.

12. The method of claim 11, wherein if in the strobe signal, the bits corresponding to the first cut are all selected, the method comprises:

calculating a second error correction code for the first cut based on data to be written to the first cut, enabling the first cut upon receipt of a second release signal that is generated to release the data to be written to the first cut, wherein the second release signal is generated (i) if none of the bits in the strobe signal corresponding to the second cut are selected, or (ii) if data previously stored in the second cut has been merged with the data to be written to the second cut and a third error correcting code for the second cut based on the merged data has been calculated.

13. The method of claim 9, wherein for the narrow type read transaction, the method comprises:

only enabling one of the first and second cuts that data is to be read from, reading data from the enabled one of the first and second cuts, detecting and correcting errors in the data read from the enabled one of the first and second cuts, and providing corrected data as data read from the enabled one of the first and second cuts, and zeros as data read from the other one of the first and second cuts.

14. The method of claim 9, wherein the first cut is an even cut of the memory bank that includes bytes with even addresses, and the second cut is an odd cut of the memory bank that includes bytes with odd address, wherein for the narrow type read transaction, only the odd cut is enabled if data to be read from the memory bank is only located in the odd cut.

15. The method of claim 9, further comprising upon receipt of a valid data transaction request, providing a power-up signal to the at least one memory bank that is in a low power mode at least one clock cycle before the at least one memory bank is accessed to configure the at least one memory bank from the low power mode to a normal operation mode.

16. The method of claim 15, further comprising determining a last transaction of the valid data transaction request, and configuring the at least one memory bank back to the low power mode if no new valid data transaction request has been received within a predetermined time threshold after the last transaction.

* * * * *